(12) United States Patent
Siboni et al.

(10) Patent No.: US 10,486,406 B2
(45) Date of Patent: Nov. 26, 2019

(54) METHOD AND APPARATUS FOR FORMING AND ADHERING PANEL AND BRACKET STRUCTURES

(71) Applicant: Zephyros, Inc., Romeo, MI (US)

(72) Inventors: Patrick Siboni, Les Granges (FR); John Blancaneaux, Fegersheim (FR)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 16/199,652

(22) Filed: Nov. 26, 2018

(65) Prior Publication Data

US 2019/0091986 A1 Mar. 28, 2019

Related U.S. Application Data

(63) Continuation of application No. 14/506,088, filed on Oct. 3, 2014, now Pat. No. 10,137,676.

(60) Provisional application No. 61/886,820, filed on Oct. 4, 2013.

(51) Int. Cl.
| | |
|---|---|
| B32B 37/00 | (2006.01) |
| C09J 5/00 | (2006.01) |
| C09J 163/00 | (2006.01) |
| F16B 11/00 | (2006.01) |
| B32B 37/12 | (2006.01) |
| C09J 5/06 | (2006.01) |

(52) U.S. Cl.
CPC .............. *B32B 37/1284* (2013.01); *C09J 5/06* (2013.01); *C09J 163/00* (2013.01); *F16B 11/006* (2013.01); *B32B 2037/1215* (2013.01)

(58) Field of Classification Search
CPC ......... B32B 37/00; B32B 37/10; B32B 37/12; B32B 37/12; B32B 37/128; B32B 37/128; B32B 37/1284; C09J 5/00; C09J 5/06; C09J 163/00; F16B 11/00; F16B 11/006
See application file for complete search history.

(56) References Cited

U.S. PATENT DOCUMENTS

| | | | |
|---|---|---|---|
| 4,110,506 | A | 8/1978 | Cottingham |
| 4,507,461 | A | 3/1985 | Bowditch |
| 4,594,291 | A | 6/1986 | Bertram |
| 4,612,156 | A | 9/1986 | Heinemeyer et al. |

(Continued)

FOREIGN PATENT DOCUMENTS

| | | |
|---|---|---|
| EP | 1916285 A1 | 4/2008 |
| JP | H11348160 A | 12/1999 |

(Continued)

OTHER PUBLICATIONS

H. Craig Silvis & Jerry E. White "Synthesis and Properties of Thermoplastic Poly(amino ether) Barrier Resins"; Polymer News, 1998, vol. 23, pp. 6-10.

(Continued)

*Primary Examiner* — Jacob T Minskey
*Assistant Examiner* — Matthew Hoover
(74) *Attorney, Agent, or Firm* — The Dobrusin Law Firm, PC

(57) ABSTRACT

The present invention includes a method for the attachment of a bracket to a panel structure comprising providing an adhesive for attaching the bracket to the panel structure; placing the bracket in a desired location on the panel structure; heating the adhesive; and hardening the adhesive so the bracket is adhered to the panel structure.

20 Claims, 3 Drawing Sheets

(56) References Cited

U.S. PATENT DOCUMENTS

| | | | |
|---|---|---|---|
| 5,089,588 | A | 2/1992 | White et al. |
| 5,134,201 | A | 7/1992 | Billovits et al. |
| 5,164,472 | A | 11/1992 | White et al. |
| 5,275,853 | A | 1/1994 | Silvis et al. |
| 5,401,814 | A * | 3/1995 | Schomaker .......... C08G 59/621 525/523 |
| 5,464,924 | A | 11/1995 | Silvis et al. |
| 5,686,551 | A | 11/1997 | White et al. |
| 5,731,094 | A | 3/1998 | Brennan et al. |
| 5,834,078 | A | 11/1998 | Cavitt et al. |
| 5,844,020 | A | 12/1998 | Paine |
| 5,852,163 | A | 12/1998 | Chen et al. |
| 5,962,093 | A | 10/1999 | White et al. |
| 5,962,621 | A | 10/1999 | Beckerdite et al. |
| 6,011,111 | A | 1/2000 | Brennan et al. |
| 6,180,715 | B1 | 1/2001 | Schmidt |
| 6,365,079 | B1 | 4/2002 | Winkler et al. |
| 6,376,583 | B1 | 4/2002 | Winkler et al. |
| 6,391,408 | B1 | 5/2002 | Hutchinson |
| 6,407,225 | B1 | 6/2002 | Mang et al. |
| 6,455,116 | B1 | 9/2002 | Xia et al. |
| 6,589,621 | B1 | 7/2003 | Beckerdite et al. |
| 6,723,443 | B2 | 4/2004 | Tsai et al. |
| 7,150,902 | B2 | 12/2006 | Farha |
| 2004/0112531 | A1 * | 6/2004 | Bogert ................... B60J 5/0437 156/307.3 |
| 2007/0270515 | A1 | 11/2007 | Chmielewski et al. |
| 2008/0029214 | A1 | 2/2008 | Hable |
| 2010/0272673 | A1 | 10/2010 | Horstman |

FOREIGN PATENT DOCUMENTS

| | | |
|---|---|---|
| WO | 98/14498 | 4/1998 |
| WO | 08/010823 | 1/2008 |

OTHER PUBLICATIONS

"New Dow Resins Combine Qualities of Epoxies and Thermoplastics"; Beverage Online dated Dec. 16, 1999.

New Resin on Blox Opens Avenues for Dow; Plastic News, Dec. 20, 1999, vol. 11, Issue 44, p. 4.

Specialty Monomers and Polymers, Synthesis, Properties, and Applications, 2000, Kathleen O. Havelka, ACS Symposium Series 755.

Jerry E. White "Poly (hydroxyaminoethers): A New Family of Epoxy-Based Thermoplastics"; Advanced Materials Dec. 1, 2000.

J. E. White, "Development of New Family Thermoplastics Employing poly(hydroxyamino ether) chemistry", Plastics, Rubber and Composites, 2000, vol. 29.

Susan A. Somers, "PHAE Blox Resins Produced via Reactice Extrusion; Results from a Designed Experiment on a ZSK-40 mm Co-Rotating Twin-Screw Extruder", Mar. 1, 2002, Dow Confidential Information.

Francois Constantin; "Blends of a New Thermoplastic in a Thermoset Epoxy Matrix"; Macromol Symp. 2003, 198 335-344.

Francois Constantin; "Post-Crosslinkable Blends: Reactions Between a Linear Poly(hydroxyl-amino ether) and a Diepoxy" dated Jun. 11, 2004.

Plastics Technology, "Adhesive Maker Develops Thermoplastic Epoxy WPC", dated Feb. 2009.

ICIS.Com, "Trusted Market Intelligence for the Global Chemical and Energy Industries", Dec. 16, 2002.

Jean-Pierre Pascault, "General Concepts and Epoxy Polymers", 2010.

Jerry E. White, "Thermoplastic Epoxy Polymers", 2010.

U.S. Appl. No. 62/010,662, filed Jun. 11, 2014.
U.S. Appl. No. 62/012,573, filed Jun. 16, 2014.
U.S. Appl. No. 62/035,677, filed Aug. 11, 2014.
U.S. Appl. No. 62/037,199, filed Aug. 14, 2014.
U.S. Appl. No. 62/042,497, filed Aug. 27, 2015.
U.S. Appl. No. 62/067,131, filed Oct. 22, 2014.

PCT International Search Report & Written Opinion dated Jan. 19, 2015 (Appln. No. PCT/US2014/059064).

Adhesive and its Application dated Jan. 31, 2012, Chapter 10, p. 228-233.

Chinese Office Action dated Feb. 3, 2017, Application No. CN201480054435.2.

* cited by examiner

METHOD AND APPARATUS FOR FORMING AND ADHERING PANEL AND BRACKET STRUCTURES

TECHNICAL FIELD

The present invention pertains generally to adhering an attachment structure to a panel, and more particularly to applying a reformable epoxy adhesive for use with an attachment adhered to a panel structure.

BACKGROUND

Panel structures are widely used in the construction and transportation industries. Such panels may be sandwich panels, monolithic panels made of composite materials, or others. These panels may be used as flooring, walls, doors, or any other large, substantially planar structures. It is often necessary to attach brackets to these panels whereby the brackets are used to attach additional components such as cables, pipes, wiring, overframe blankets to the panels. Traditionally, these brackets are attached to the panels by gluing or by mechanical attachment. For example, a current practice is to use adhesive and mounting systems such as those offered by Click Bond, Inc. in Carson City, Nev. However, disadvantages associated with these adhesive and mounting systems include long wait times for curing, thereby requiring space or storage area for these large panels; added manufacturing cost; and required application of pressure using a clamp or other device to hold the bracket in place during these long cure times. Clamps or other devices are then removed manually. This step adds manufacturing cost. Thermoset adhesives are also not reversible and panels are often locally damaged when bracket has to be removed because positioned incorrectly. Repair to the damaged panel is very costly and time consuming. Thermoset adhesives are also often made of two components which have to be mixed accurately which is time consuming and generate wastes.

There is therefore a need for an adhesive that avoids the problems of long curing times and space needed for the panels during these curing times and avoids the costly step of removing clamps or other devices and which can be easily debonded on demand.

SUMMARY OF THE INVENTION

The present invention meets one or more of the above needs by the improved devices and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide for a method for the attachment of a bracket to a panel structure comprising providing a reformable epoxy resin adhesive for attaching the bracket to the panel structure, placing the bracket in a desired location on the panel structure, heating the adhesive, and hardening the adhesive so the bracket is adhered to the panel structure. The adhesive may be applied to the bracket prior to the placing step. The adhesive may be applied to the panel structure prior to the placing step. The hardening step may be accomplished by cooling the adhesive. The adhesive may be fully adhered upon cooling to ambient temperature. The heating step may be performed by induction heating with metal wires on the bracket. The heating step may be performed by heating metal within the adhesive or by heating metallic fillers located within the adhesive. The method may further comprise a reheating step, wherein the adhesive can be heated again above its glass transition temperature, its melting temperature, or both so the bracket and the panel structure are debonded. The adhesive may be a hot melt adhesive. The hot melt adhesive may be applied to the panel using a hot melt pressurized gun device. The adhesive may be formed as a film. The film may be applied directly to the bracket by overmolding. The film may be applied directly to the panel.

The teachings herein provide for a reformable epoxy adhesive that has significant advantages over typical paste materials utilized for attaching elements to panel structures. The adhesive hardens quickly so that the panels do not need to be stored during adhesive cure. The adhesive leads to minimal waste and mass as compared with typical pastes and can be quickly and easily applied. The adhesive can be debonded by heating the adhesive to a temperature above its glass transition temperature, its melting temperature, or both.

DETAILED DESCRIPTION

The teachings herein make advantageous use of a method and apparatus for forming and adhering panel and bracket structures. The teachings herein contemplate a method for adhering components to panels, such as panels used in the construction, automobile and aircraft industries, particularly in adhering bracket structures to panels such as those used in the interior of vehicles or buildings as flooring, doors, airframe structure panels, internal walls, or the like. It is often necessary to adhere structures such as brackets.

This application claims the benefit of the filing date of U.S. Provisional Application Ser. No. 61/886,820 filed Oct. 4, 2013, the contents of this application being hereby incorporated by reference for all purposes.

In a preferred embodiment of the invention, bracket structures and/or additional components are attached to the panels by an adhesive film or hot melt adhesive. The terms bracket structure and component are used interchangeably herein and may describe attachments connected directly or indirectly to a panel structure. Components of the present invention may be a clip, a plug, a handle, a hinge, a lock, an identification tag, or any other attachment and may be of any material such as metal, wood, or molded plastic. The components may be used to attach secondary components including cables, pipes, wiring, overframe blankets, or the like.

In one embodiment of the present invention, the hot melt or film adhesive is used to attach the component to a panel structure which may comprise panels consisting of a honeycomb core provided with two facing sheets. In this instance, the honeycomb may be of paper, fabric, plastic, or metal such as a metallic grid which may be of aluminum. The panels may also be monolithic panels which may comprise a metallic material or may more specifically comprise, aluminum or titanium. The panels may also comprise composite materials, which may be carbon reinforced composite panels. Similarly, the panels may comprise paper, plastic, carbon or glass fiber, metal, carbon/glass/aramide fiber reinforced thermosetting resins such as but not limited to epoxy, phenolic, cyanate ester or benzoxazyne prepreg or carbon/glass/aramide fibers reinforced thermoplastic resins such as but not limited to PPS, PC, PA. It is also contemplated that the panel (which may include a facing and/or honeycomb portion) may be formed from a fabric impregnated with a pre-cut reformable epoxy resin film, pultruded reformable epoxy resin long fibers, or thermoplastic tapes or fabrics.

Figure 1:
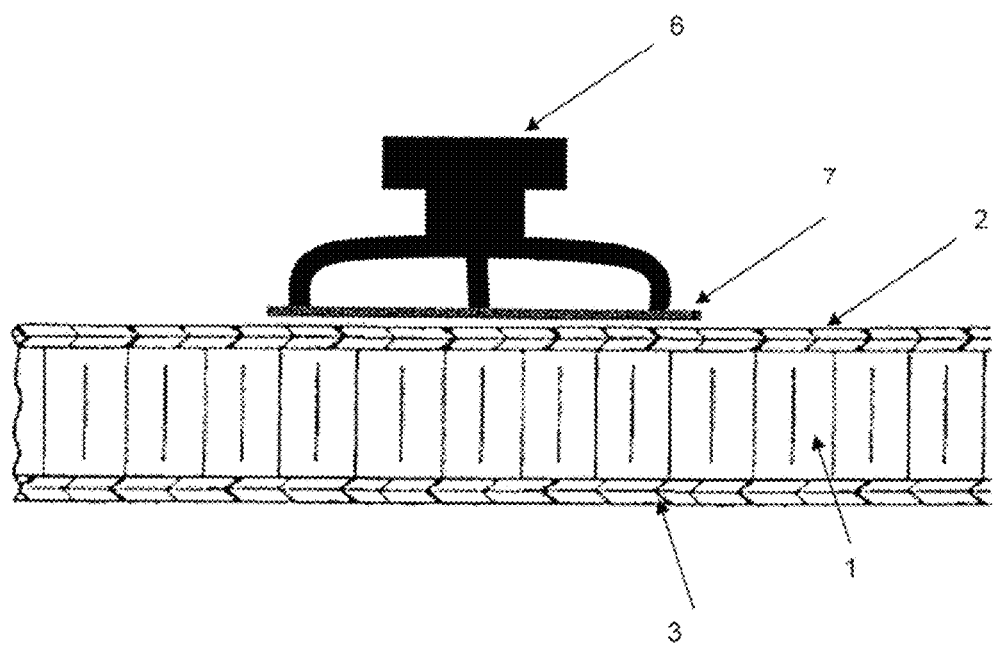
FIG. 1 shows an exemplary embodiment with an adhesive attaching a component to a honeycomb structure panel.
Figure 2:
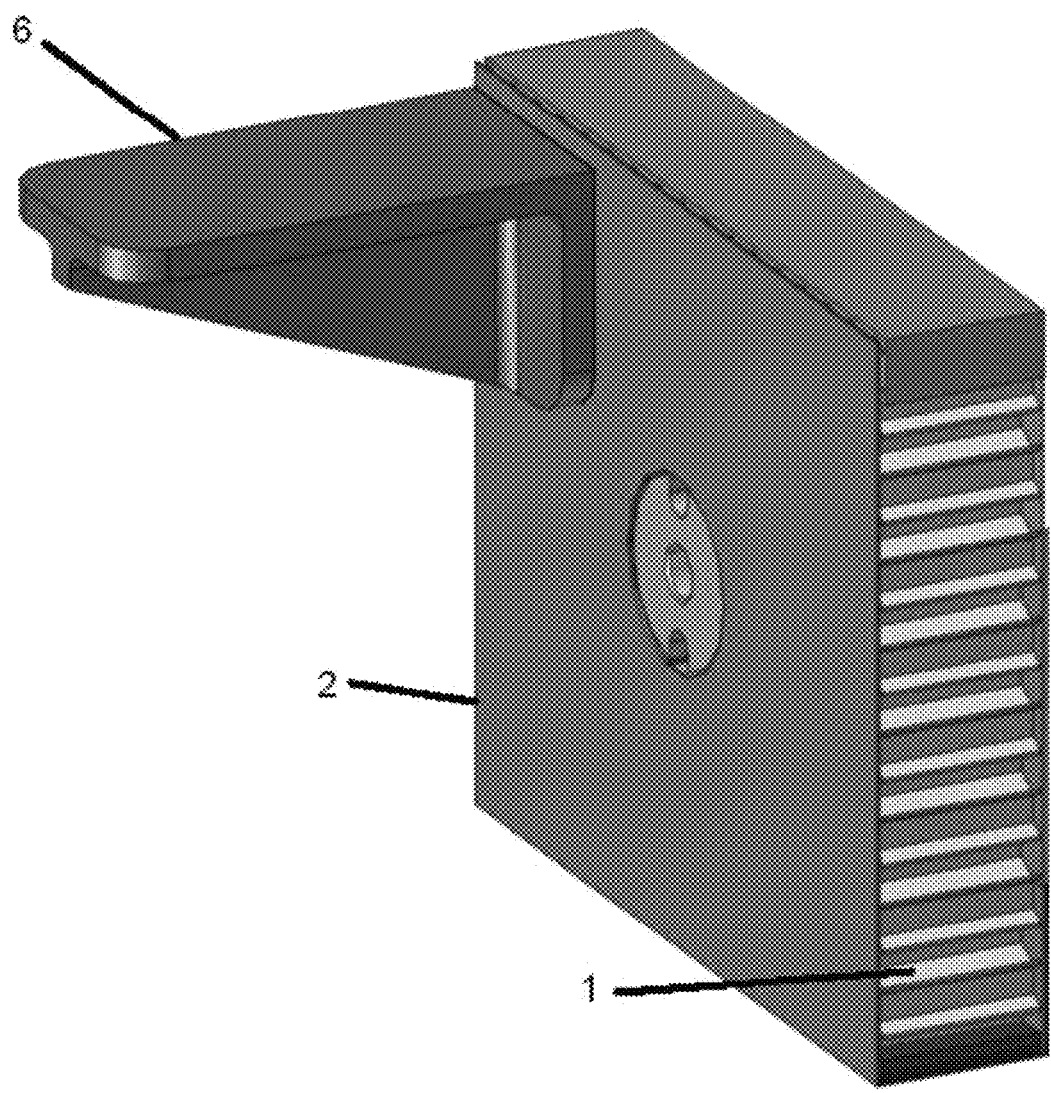
FIG. 2 shows another exemplary embodiment of a bracket adhered to a honeycomb structure panel.
Figure 3:
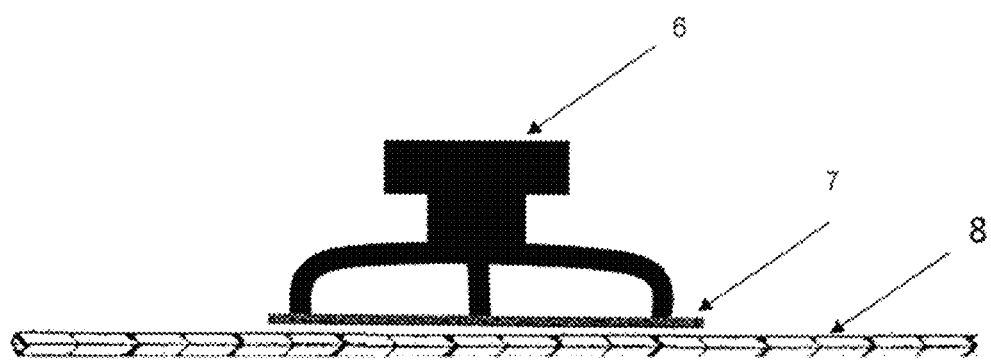
FIG. 3 shows another exemplary embodiment of a bracket adhered to a monolithic panel.

In an exemplary embodiment, FIG. 1 shows a honeycomb portion 1 provided with an outer facing sheet 2 and an inner facing sheet 3 and a component or bracket 6 provided with an adhesive 7. FIG. 2 shows another view of a honeycomb portion 1, outer facing sheet 2, and a bracket 6. FIG. 3 shows a monolithic panel 8 including a bracket 6 attached thereto via an adhesive 7.

In one embodiment of the present invention, it is contemplated that a panel, such as a sandwich panel or monolithic panel, and a bracket or other component are provided. A reformable epoxy resin hot melt adhesive or film adhesive may then be applied to the bracket or directly to the panel. The bracket is then positioned on the panel in the desired location. It is contemplated that a heating step (which may occur via a hot melt glue gun device) may be required to cause the adhesive to be more workable, and it is contemplated that this heating step may occur prior to or during positioning the bracket on the panel or after positioning the bracket on the panel. The adhesive is then allowed to harden and/or return to a solid state upon cooling so the panel and the bracket are bonded together.

While it is possible to use a hot melt adhesive, the present invention also contemplates using an adhesive film. Use of a hot melt or film can be beneficial, as it enables the user to control the quantity and distribution of the adhesive, while reducing excess adhesive in undesired areas, which may assist in handling the adhesive.

It is contemplated that the adhesive can be a reformable epoxy resin adhesive. Such reformable epoxy resin materials are advantageous as they allow for significantly faster hardening and adhesion, thereby reducing the need for extended periods of time and large areas of space for curing adhesives in large panels. Because of the faster hardening time, this may also reduce or eliminate the need for clamps or another apparatus to apply pressure and hold the bracket in place while the adhesive is returning to a solid state. While reformable epoxy resin adhesives may be workable at ambient temperature, it is often desirable to have a heat applying step to soften or melt the adhesive to allow it to move or become more workable. Adhesion, hardening, and returning to a solid state upon cooling of the reformable epoxy resin adhesive begins almost immediately after heating is stopped and full adhesion can occur within about 10 seconds to about 60 seconds (e.g., about 30 seconds). It is contemplated that allowing the adhesive to return to ambient temperature is sufficient for adhesion, and additional hardening steps such as cooling steps are possible, but not necessary.

In addition, a reformable epoxy resin adhesive may be desirable because of its long shelf life. It also may not require storage at a refrigerated temperature, unlike some liquid adhesives. The reformable epoxy resin may also be removable with the addition of heat. There is also no need to rework the panel to be able to reposition the bracket. In addition, the adhesive both bonds and debonds quickly (less than 20 minutes, less than 10 minutes or even less than 5 minutes). The adhesive provides for minimal waste (especially as compared to pumpable paste products) as only the necessary amount of adhesive can be quickly and easily applied. The adhesive requires minimal clean up and is dry to the touch. In addition, the adhesive has low odor by comparison with other adhesives (especially pumpable paste materials). In addition the adhesive doesn't require mix of two components as for thermoset adhesives.

The reformable epoxy resins described herein preferably comprise bisphenol A diglycidyl ether (BADGE) and monoethanolamine and may exhibit a $T_g$ of 80° C. For some applications that may require a higher glass transition temperature ($T_g$), it is contemplated that BADGE may be replaced by an epoxy monomer with less mobility. Such epoxy monomers may include diglycidylether of fluorene diphenol or 1,6 naphthalene diepoxy. Also, it is contemplated that where fire resistance is desired, BADGE can be replaced by a brominated bisphenol A epoxy resin.

Alternatively, the reformable epoxy resin materials disclosed herein may also be known as poly(hydroxyamino ether) (PHAE) and is illustrated in U.S. Pat. Nos. 5,164,472; 5,275,853; 5,401,814 and 5,464,924, all incorporated by reference herein for all purposes. Such polyethers may be prepared by reacting a diglycidyl ether of dihydric aromatic compounds such as the diglycidyl ether of bisphenol A, or a diepoxy-functionalized poly(alkylene oxide) or mixture thereof with a primary amine or a secondary diamine or a monoamine functionalized poly(alkylene oxide) or mixture thereof. Such material generally has a relatively high flexural strength and modulus—often much higher than typical polyolefins (i.e. polyethylene and polypropylene)—and has the added benefit of being melt processable at temperatures of 150 to 200° C.

The adhesive may be heated before the bracket is positioned on the panel. When the heating is stopped, it is desired that the bracket is immediately positioned on the panel because the adhesive may begin hardening and adhering immediately upon cooling. It is also contemplated that the heat can be applied after the bracket is in the desired position on the panel. Again, when the heat is discontinued, as the adhesive begins cooling, it hardens and adheres the bracket to the panel.

A heat source can be applied to soften the adhesive and allow for it to be more workable. For example, it is contemplated that the heating may occur by induction heating with metal wires on the bracket. Alternatively, it is also contemplated that metal (which may be metallic fillers) within the adhesive itself can be heated to cause the adhesive to soften. Other methods of heating the adhesive are also possible.

With the reformable epoxy resin adhesive as disclosed herein, it is also possible that the bond formed between the adhesive and the substrates such as the bracket and/or the panel can be debonded by increasing the temperature over the adhesive $T_g$ and/or melt temperature to allow the bonded substrates to be separated.

The bonding process and also any debonding process may involve locating a layer of adhesive onto a panel or onto a bracket. The adhesive layer may be located onto either via a hot melt glue gun or may alternatively be formed as a film structure and applied directly to the panel and/or bracket. The adhesive may be activated by one or more of the following: induction, ultrasonic energy, high frequency, rotational friction, infrared, heated pulse, or a heated plate.

In one specific embodiment, the adhesive described herein may be used to attach brackets to a panel for use within an aerospace vehicle. The panel may have an aluminum or carbon fiber composite facing for receiving the bracket. The adhesive may be injection molded or overmolded onto a bracket or a portion of the bracket. The adhesive may be activated just prior to, during, or after locating the bracket (e.g., a portion of the bracket) into contact with the panel. The adhesive have must certain strength requirements for sufficient connection between the panel and bracket. The lap shear strength of the adhesive must be at least 10 MPa (for a 10 mm bondline).

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for ail purposes. The term "consisting essentially of to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A device for adhering a panel structure comprising:
   a bracket structure;
   a dry to the touch film material located onto a first surface of the bracket, the film material comprising a reformable epoxy resin adhesive comprising a reaction product of bisphenol A diglycidyl ether and monoethanolamine;
   a metallic component present in the bracket structure and/or the film material.

2. The device according to claim 1, wherein the film material is applied to the bracket and activatable upon exposure to heat.

3. The device according to claim 1, including a means for connecting the bracket to a secondary component.

4. The device according to claim 1, wherein the metallic component includes metal wires on the bracket.

5. The device according to claim 1, wherein the metallic component includes metal within the film material.

6. The device according to claim 1, wherein the film material is an overmolded film material.

7. The device according to claim 1, wherein the film material is free of any thermoset adhesive.

8. The device according to claim 6, wherein the film material is applied to the bracket and activatable upon exposure to heat.

9. The device according to claim 7, wherein the film material is applied to the bracket and activatable upon exposure to heat.

10. The device according to claim 6, including a means for connecting the bracket to a secondary component.

11. The device according to claim 7, including a means for connecting the bracket to a secondary component.

12. The device according to claim 3, wherein the metallic component includes metal wires on the bracket or metal within the film material.

13. The device according to claim 6, wherein the metallic component includes metal wires on the bracket or metal within the film material.

14. The device according to claim 7, wherein the metallic component includes metal wires on the bracket or metal within the film material.

15. The device according to claim 1, wherein the metallic component includes metal within the film material in the form of a metallic filler.

16. The device according to claim 6, wherein the metallic component includes metal within the film material in the form of a metallic filler.

17. The device according to claim 8, wherein the metallic component includes metal within the film material in the form of a metallic filler.

18. The device according to claim 1, wherein the bracket is adapted to be attached to a honeycomb panel.

19. The device according to claim 3, wherein the device is adapted for exposure to heat.

20. The device according to claim 18, wherein the honeycomb panel is adapted for installation in an aerospace vehicle.

* * * * *